(12) United States Patent
Schäfer

(10) Patent No.: US 7,625,032 B2
(45) Date of Patent: Dec. 1, 2009

(54) PASSENGER COMPARTMENT OF A MOTOR VEHICLE

(75) Inventor: Thilo Schäfer, Gross-Gerau (DE)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 12/260,681

(22) Filed: Oct. 29, 2008

(65) Prior Publication Data
US 2009/0121512 A1 May 14, 2009

(30) Foreign Application Priority Data
Nov. 3, 2007 (DE) .................. 10 2007 052 589

(51) Int. Cl.
*B62D 25/14* (2006.01)
(52) U.S. Cl. ..................... 296/97.23; 296/70
(58) Field of Classification Search ............. 296/97.23, 296/70, 75
See application file for complete search history.

(56) References Cited

U.S. PATENT DOCUMENTS

| | | | | |
|---|---|---|---|---|
| 5,439,725 A | * | 8/1995 | Roberts | 428/95 |
| 5,573,294 A | * | 11/1996 | Mack | 296/97.23 |
| 6,695,374 B1 | * | 2/2004 | Gebreselassie et al. | 296/24.3 |
| 2004/0207228 A1 | * | 10/2004 | Gebreselassie et al. | 296/70 |

* cited by examiner

*Primary Examiner*—Joseph D Pape
(74) *Attorney, Agent, or Firm*—Ingrassia Fisher & Lorenz, P.C.

(57) ABSTRACT

A passenger compartment of a motor vehicle, in particular a passenger automobile, is provided having a dashboard, which has a lower cover connected thereto, and having a carpet laid out in the foot well of the vehicle, which is situated raised up from the foot well floor in the area of a forward front wall of the vehicle. In this passenger compartment, the carpet is provided with at least one molded-on support for the forward area of the cover of the dashboard in its raised area. A simple, and also secure mounting of a lower cover for a dashboard, which is rapid to mount, is provided in this way in a motor vehicle.

8 Claims, 2 Drawing Sheets

PASSENGER COMPARTMENT OF A MOTOR VEHICLE

CROSS-REFERENCE TO RELATED APPLICATION

This application claims priority to German Patent Application No. 102007052589.5, filed Nov. 3, 2007, which is incorporated herein by reference in its entirety.

TECHNICAL FIELD

The technical field relates to a passenger compartment of a motor vehicle, in particular a passenger automobile, having a dashboard, which has a lower cover connected thereto, and having a carpet laid out in the foot well of the vehicle, which is situated raised up from the foot well floor in the area of a forward front wall of the vehicle.

BACKGROUND

The design of a passenger compartment for a motor vehicle is well-known in particular for passenger automobiles. The lower cover of the dashboard is exclusively fastened to the dashboard itself. The fastening is performed in the front and rear areas of the cover, each in relation to the orientation of the vehicle in the travel direction during forward travel.

Because of the existing quality requirements, foot wells of vehicles are typically designed having carpets. In addition, insulation may be provided to optimize the noise behavior in the vehicle interior. In vehicles which are provided with a central tunnel, the carpets of the foot wells are raised up laterally on the central tunnel.

Actuation pedals are located in the foot well of the driver. The disadvantage is often to be noted here that the carpet, which is to be fastened behind the pedals and is slotted for this purpose in the area of its upper end, detaches and catches between the pedals. To prevent this, a separate fastening of the carpet is to be provided in this area, for example, using separate clips. This requires an increased component and mounting outlay.

In view of the foregoing, at least one object is to specify a mounting of a lower cover for a dashboard in a motor vehicle which is simple and also reliable and rapid to mount. In addition, other objects, desirable features, and characteristics will become apparent from the subsequent summary and detailed description and the appended claims, taken in conjunction with the accompanying drawings and this background.

SUMMARY

The at least one object, and other objects, desirable features, and characteristics, is achieved in a passenger compartment with a carpet that has at least one molded-on support for the forward area of the cover of the dashboard in its raised area.

In the passenger compartment according to an embodiment of the invention, the mounting of the forward area of the cover of the dashboard is thus performed on the molded-on support of the carpet in its raised area. It is thus not necessary to connect the cover to the dashboard in the forward area thereof. Accordingly, the cover is preferably only connected to the dashboard in its rear area. The connection is performed there using clip connections, for example. This forward loose support of the cover of the dashboard on the carpet allows the mounting of the vehicle to be significantly simplified in this area.

It is viewed as especially advantageous if the upper end of the carpet projects in its raised area beyond the lower level of the fastened cover of the dashboard. The fastening of the carpet under the dashboard in the foot well area is achieved via the carpet excess toward the cover of the dashboard. In addition, this prevents the carpet from catching and the pedals. Furthermore, a rattle-free support of the cover situated below the dashboard is achieved by the molded-on supports in the carpet. This support and the fastening of the carpet in the foot well are preferably achieved during the mounting of the carpet. The carpet extension may be guided automatically, in particular over the shape of an insulation of the inner front wall of the foot well. This carpet extension engages in the gap between cover and front wall directly behind the cover of the dashboard and thus prevents it from falling back into the foot well or into the area of the pedals. As soon as the final position of the carpet is reached, the cover of the dashboard also lies at the intended installation height. Falling, sinking, or creeping of the panel (over a long time) into the foot well is also prevented by the molded-on support.

An additional insulation, which is attached to the top of the cover of the dashboard, may fulfill by excess the tolerance compensation, for example, of the dashboard to the insulation of the inner front wall, also to the console or other panel parts, and thus ensure that the overall system is implemented as acoustically tight.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
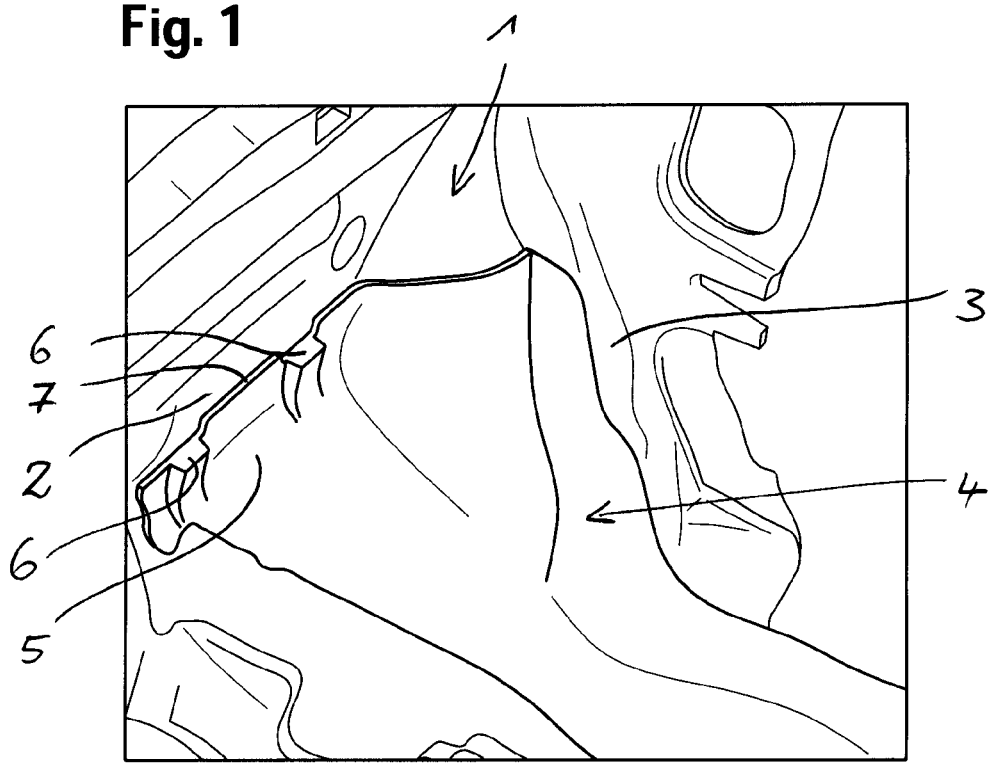
FIG. 1 shows a spatial view of the driver foot well of a passenger automobile, having carpet laid out in the foot well, illustrated without the dashboard of the passenger automobile.

The following detailed description is merely exemplary in nature and is not intended to limit the application and uses. Furthermore, there is no intention to be bound by any theory presented in the preceding summary and background or the following detailed description.

The foot well 1, which is delimited at the front by a front wall 2 and toward the passenger foot well by a console 3, and on the bottom by the foot well floor 12, is shown for a passenger compartment of a passenger automobile.

A carpet 4 is laid out in the foot well. This carpet rests on the floor 12, furthermore, it is raised in the area of the front wall 2 and the console 3 as well as the exterior side of the foot well (not relevant in the present case). The carpet 4 is stiffened by insulation material (not shown) connected thereto. The carpet 4 has a raised area 5 adjacent to the front wall 2, in whose upper end area the carpet is provided in the exemplary embodiment with two molded-on supports 6, which are directed into the foot well. The carpet 4 is lengthened slightly upward between these two supports 6. The corresponding carpet extension is identified by the reference numeral 7.

Figure 2:
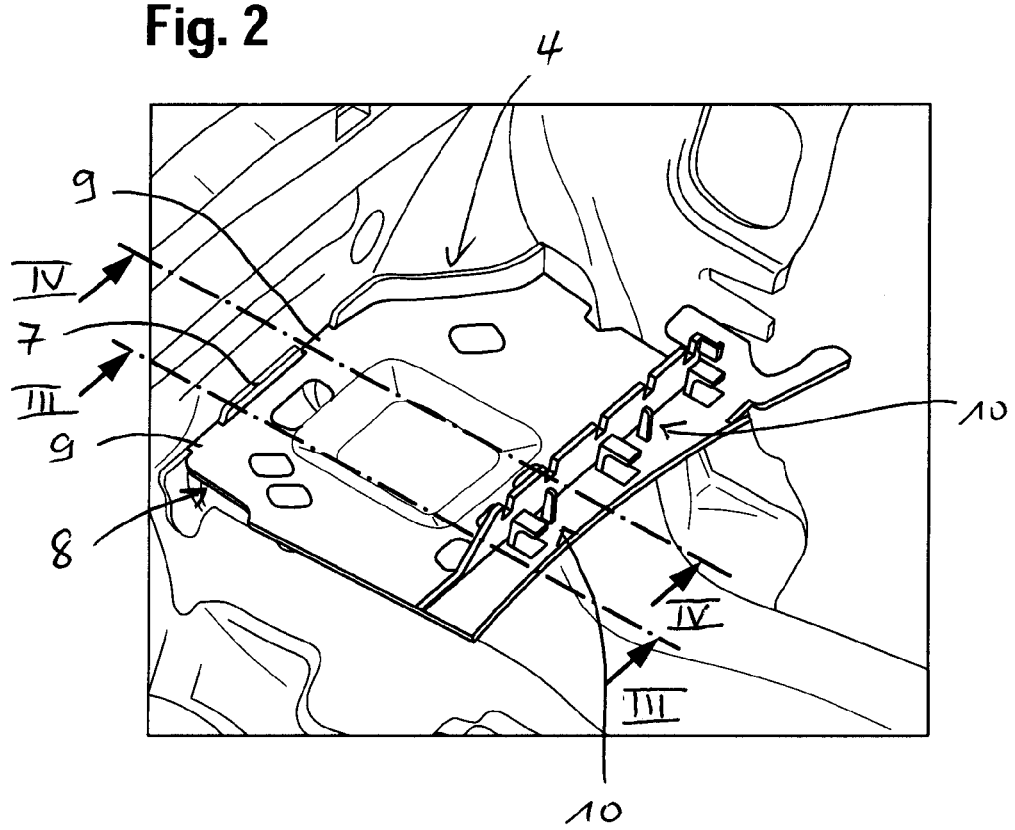
FIG. 2 shows the spatial view having lower cover of the dashboard located in the installation position, illustrated without dashboard.
Figure 3:
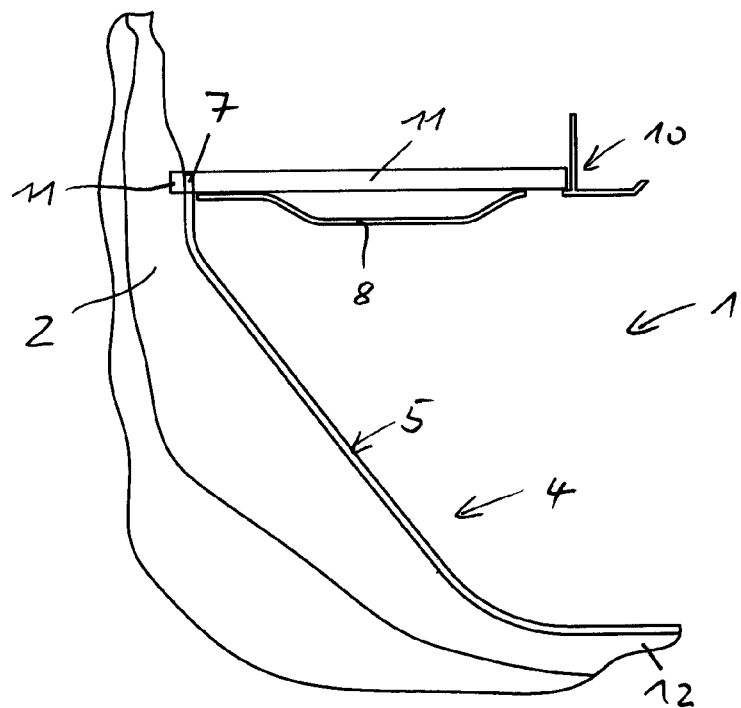
FIG. 3 shows a section through the configuration shown in FIG. 2 along line III-III in FIG. 2, with upper insulation of the cover.
Figure 4:
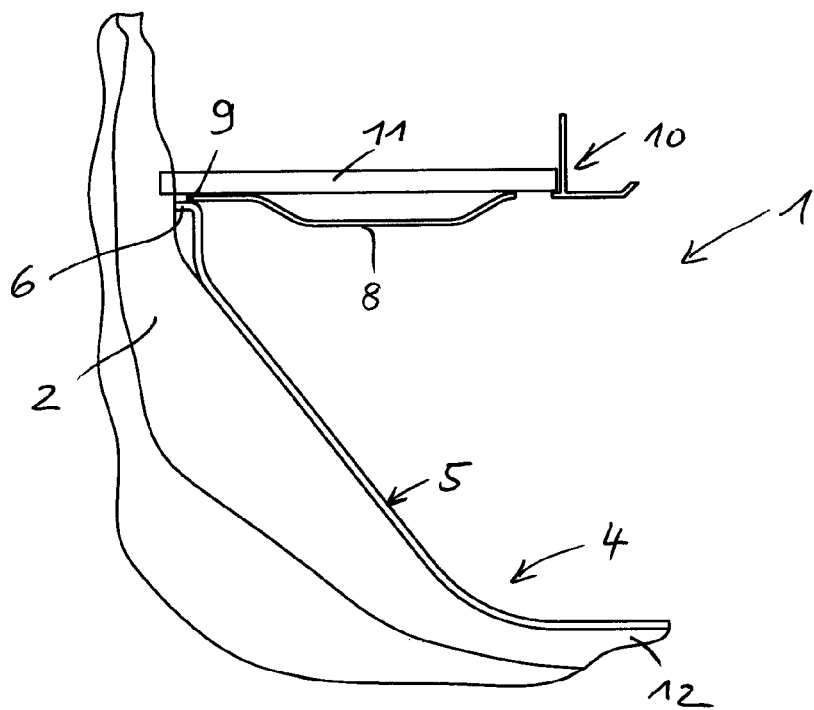
FIG. 4 shows a section through the configuration shown in FIG. 2 along line IV-IV in FIG. 2, with upper insulation of the cover.

The dashboard (not shown) is situated in the transverse direction of the passenger automobile. This is closable in the area of its lower opening using a cover, in particular for noise reasons. Only this cover 8 is shown in FIG. 2. The dashboard (not shown) is located above this cover.

This cover 8 is mounted in its forward area on the supports 6 of the carpet 4 and is connected in its rear area to the bottom side of the dashboard. For this purpose, the cover 8 is provided at the front with two projections 9, which rest on the supports 6 and accommodate the carpet extension 7 between them. In the rear area, the cover 8 is provided with multiple clip connections 10 for the catch connection to complementary receptacles on the bottom side of the dashboard.

In addition, for the purpose of optimizing under the aspect of noise insulation, the cover 8 is provided on its top side with insulation 11.

For the carpet 4 laid out in the foot well 1, the cover 8 is laid out having its projections 9 on the supports 6 and the two projections 9 are thus additionally positioned laterally between the carpet extension 7. The clip connections 10 of the cover 8 are then engaged with the complementary receptacles on the bottom side of the dashboard by pivoting the rear end of the cover 8 upward. In this way, the cover 8 is positioned securely and noise-optimized in relation to the carpet 4 and the dashboard. In this installation position, the essentially flatly designed cover 8 is oriented horizontally. The cover 8 rests loosely on the supports 6 of the carpet 4 in its forward area. The carpet extension 7 is positioned and retained by the design of the cover 8 in such a way that the carpet 4 is prevented from falling back in this area into the foot well or into the area of the pedals of the foot well 1. The relatively stiff implementation of the carpet 4 in the area of the molded-on supports 6 also contributes thereto.

Instead of the described mounting of cover 8 having insulation 11 and carpet 4, according to a variant, the possibility exists of mounting the carpet 4 last. In this case, the cover 8 is mounted together with the dashboard. For this purpose, the cover 8 is connected via the clip connections 10 to the dashboard in the area of the rear end of the cover 8. The dashboard is mounted. Subsequently, the carpet 4 is laid out, the supports 6 of the carpet 4 contacting the projections 9 of the cover 8, so that the cover 8 rests loosely on the supports 6 of the carpet 4. Concretely, the cover 8, which is only connected to the dashboard using the clip connections 10, is positioned inclined somewhat downward before the mounting of the dashboard at the front, so that when the carpet 4 is laid out, the carpet extension 7 may be guided without further measures between the cover 8 and a front wall 2. When the carpet 4 is laid out, because of contact of supports 6 of the carpet 4 and the projections 9 of the cover 8, it is pivoted somewhat upward and the carpet extension 7 is thus retained between the cover 8 and a front wall 2. The cover 8 is brought into its planned height position by reaching the final position of the carpet 4.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A passenger compartment of a motor vehicle, comprising:
    a dashboard;
    a lower cover connected to the dashboard
    a foot well; and
    a carpet laid out in the foot well situated in a raised up position from a floor of the foot well in an area of a forward front wall of the motor vehicle,
    wherein the carpet has a molded-on support for a forward area of the lower cover in a raised area.

2. The passenger compartment according to claim 1, wherein the lower cover rests loosely at a front on the molded-on support.

3. The passenger compartment according to claim 1, wherein the lower cover is only connected to the dashboard in a rear area.

4. The passenger compartment according to claim 3, wherein the lower cover is connected to the dashboard with a clip connection.

5. The passenger compartment according to claim 1, wherein an upper end of the carpet projects in the raised area above a lower level of the lower cover.

6. The passenger compartment according to claim 1, wherein the molded-on support is flatly implemented and a receptacle face of the molded-on support is oriented horizontally.

7. The passenger compartment according to claim 1, wherein the lower cover is provided on a top side with an insulation.

8. The passenger compartment according to claim 1, wherein the foot well is the driver foot well.

* * * * *